United States Patent
Karimli et al.

(10) Patent No.: US 10,827,435 B2
(45) Date of Patent: Nov. 3, 2020

(54) HETEROGENEOUS UPLINK SYNCHRONOUS CHANNEL (HUSCH) TECHNOLOGY FOR COEXISTENCE

(71) Applicant: T-Mobile USA, Inc., Bellevue, WA (US)

(72) Inventors: Yasmin Karimli, Kirkland, WA (US); Gunjan Nimbavikar, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 39 days.

(21) Appl. No.: 16/254,323

(22) Filed: Jan. 22, 2019

(65) Prior Publication Data

US 2020/0236631 A1    Jul. 23, 2020

(51) Int. Cl.
*H04W 52/24*    (2009.01)
*H04W 76/10*    (2018.01)
(Continued)

(52) U.S. Cl.
CPC ..... *H04W 52/244* (2013.01); *H04W 72/0453* (2013.01); *H04W 72/082* (2013.01);
(Continued)

(58) Field of Classification Search
CPC ........... H04W 52/244; H04W 72/0453; H04W 76/10; H04W 72/082; H04W 72/085; H04W 88/02; H04W 88/08
(Continued)

(56) References Cited

U.S. PATENT DOCUMENTS

2014/0211654 A1    7/2014    Liu et al.
2017/0188314 A1    6/2017    Mueck et al.
(Continued)

FOREIGN PATENT DOCUMENTS

WO    WO2018/125686 A2    7/2018

OTHER PUBLICATIONS

Krishnan et al, "Coexistence of Radar and Communication Systems in CBRS Bands Through Downlink Power Control", In: 2017 IEEE Military Communications Conference (MILCOM), Dec. 11, 2017, pp. 715-718.
(Continued)

*Primary Examiner* — Kwang B Yao
*Assistant Examiner* — Syed M Bokhari
(74) *Attorney, Agent, or Firm* — Lee & Hayes, P.C.

(57)    ABSTRACT

Techniques for dynamically determining coverage area and data throughput in a heterogeneous network are discussed herein. In some examples, a base station can use frequency resources from a Citizens Broadband Radio Service band provided that such use does not cause harmful interference for incumbent users. For example, to avoid interfering with an incumbent device while maintaining transmission, an algorithm may be deployed to dynamically determine data throughput for the base station and connected user equipment based on interference level and traffic type. The base station can receive interference information with uplink feedback from the user equipment. Interference information can also be used to configure the base station to dynamically adjust its data coverage area, for example, by varying a transmission power. As the conditions at a base station change over time (e.g., hourly, daily, weekly, etc.), data coverage area can be reconfigured at the base station.

17 Claims, 5 Drawing Sheets

(51) Int. Cl.
*H04W 72/04* (2009.01)
*H04W 72/08* (2009.01)
*H04W 88/08* (2009.01)
*H04W 88/02* (2009.01)

(52) U.S. Cl.
CPC ......... *H04W 72/085* (2013.01); *H04W 76/10* (2018.02); *H04W 88/02* (2013.01); *H04W 88/08* (2013.01)

(58) Field of Classification Search
USPC ........................................ 370/329, 336, 330
See application file for complete search history.

(56) References Cited

U.S. PATENT DOCUMENTS

| | | | |
|---|---|---|---|
| 2017/0238334 A1* | 8/2017 | Yang | H04W 74/0808 370/336 |
| 2017/0295497 A1* | 10/2017 | MacMullan | H04W 16/14 |
| 2019/0020521 A1 | 1/2019 | Finkelstein | |
| 2019/0053000 A1* | 2/2019 | Filippou | G06F 8/00 |
| 2019/0098666 A1* | 3/2019 | Chen | H04L 43/0888 |
| 2019/0124541 A1* | 4/2019 | Henry | H04L 12/66 |
| 2019/0124665 A1* | 4/2019 | Singh | H04W 16/04 |
| 2019/0150134 A1* | 5/2019 | Kakinada | H04L 69/18 370/330 |
| 2019/0191314 A1* | 6/2019 | Mueck | H04W 52/243 |
| 2019/0281546 A1* | 9/2019 | Lim | H04L 1/001 |
| 2019/0394678 A1* | 12/2019 | Syed | H04W 24/02 |
| 2020/0053669 A1* | 2/2020 | Hannan | H04W 52/367 |

OTHER PUBLICATIONS

PCT Search Report and Written Opinion dated Apr. 28, 2020, for PCT Application No. PCT/US2020/012673, 15 pages.

* cited by examiner

HETEROGENEOUS UPLINK SYNCHRONOUS CHANNEL (HUSCH) TECHNOLOGY FOR COEXISTENCE

BACKGROUND

Wireless carriers offering network services may operate using spectrum licensed from a governmental agency associated with a country or jurisdiction. In some areas, the agency may restrict the use of specific portion of spectrum for a specific incumbent class of users (e.g., military, other federal users, etc.). However, as data traffic from mobile devices (e.g., cell phones, tablets, laptops, etc.) has increased, some governments have made restricted spectrum available to carriers as shared spectrum. Shared spectrum may include spectrum that carriers can use for free or at a reduced cost, provided that the carriers' traffic does not cause harmful interference for incumbent users.

For example, in the United States of America (U.S.A.), the Citizens Broadband Radio Service (CBRS) enables shared wireless broadband use of the 3550-3700 megahertz (MHz) band (3.5 gigahertz (GHz) band). Historically, a portion of the CBRS band has been used by the United States Navy, satellite service providers, and utilities. However, the CBRS band has recently been availed for new commercial mobile uses.

CBRS is governed by a three-tiered spectrum authorization framework to accommodate a variety of commercial uses on a shared basis with incumbent users of the 3.5 GHz band. The three-tiered spectrum authorization framework provides Incumbent Access users priority access over Priority Access users, and Priority Access users priority access over General Authorized Access users. Incumbent Access users include authorized federal and grandfathered Fixed Satellite Service users. The Federal Communications Commission (FCC) has implemented rules protecting such users from harmful interference from Priority Access and General Authorized Access users. That is, Incumbent Access users have priority access to the 3.5 GHz band within exclusion zones. An exclusion zone is any geographic area that has been designated by the governing agency (e.g., FCC) as priority access area (e.g., within certain radius of certain cities, certain locations, or near coastal areas, etc.) for Incumbent Access users. Priority Access users are granted access to the 3.5 GHz band via a Priority Access License assigned using competitive bidding within the 3550-3650 MHz portion of the 3.5 GHz band. General Authorized Access users are granted access via a licensed-by-rule, which permits open, flexible access to any portion of the 3550-3700 MHz band, so long as the portion of the 3550-3700 MHz band is not assigned to a higher tier (e.g., Incumbent Access or Priority Access). In some situations, access to the CBRS can be controlled, at least in part, by a Spectrum Access System (SAS), which may utilize rules to protect Incumbent Access uses and Priority Access users.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
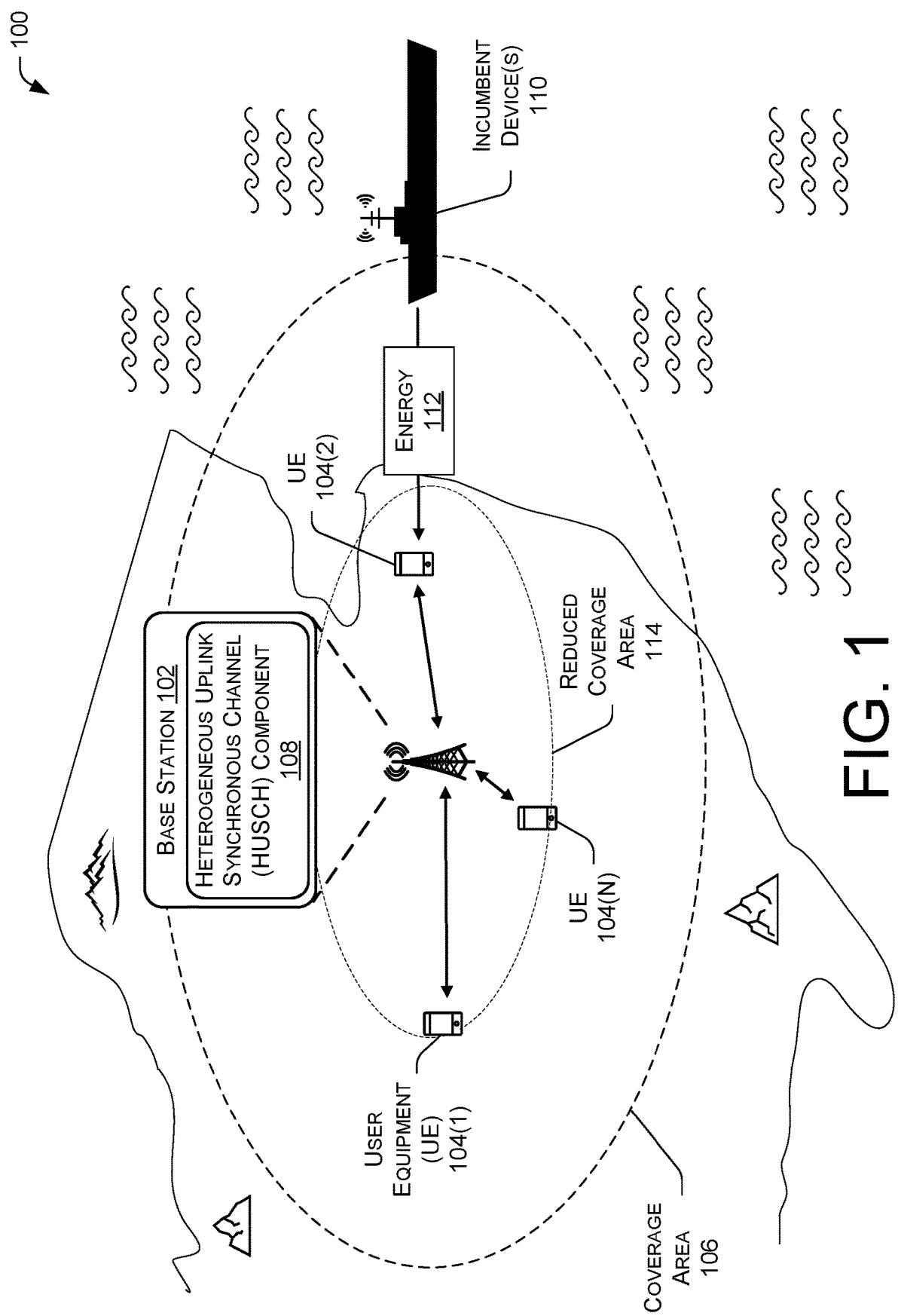
FIG. 1 illustrates an example environment including a base station and a plurality of user equipment (UEs), the base station and the UEs including functionality to dynamically reduce transmit power, based on interference information, to coexist and avoid harmful interference with incumbent devices, in accordance with embodiments of the disclosure.

Systems, devices, and methods are directed to dynamically adjusting data coverage and data throughput for coexistence with incumbent users in a heterogeneous network. For example, a base station can detect wireless energy from incumbent devices (e.g., in a spectrum associated with the Citizens Broadband Radio Service (CBRS)) and/or receive interference information from devices in communication with the base station, determine the interference level, and dynamically reduce transmit power to avoid harmful interference. By doing so, data transmission between a base station and a user equipment (UE) may continue rather than pausing and waiting for the channel to be free of incumbent users, thereby allowing data traffic to coexist between priority users and incumbent users. In this way, the communication channel can be maintained rather than paused.

In some examples, the base station can use a heterogeneous uplink synchronous channel (HUSCH) algorithm to determine an amount of data coverage to coexist with and to avoid harmful interference with incumbent devices within an exclusion zone. Upon determining the amount of data coverage for a base station, the base station can be configured to increase or reduce its data footprint based on the amount of data coverage. In additional examples, the base station and the UE can use the HUSCH algorithm to determine data throughput for communications. That is, in absence of incumbent devices within the exclusion zone, the base station and UEs may communicate freely, but when an incumbent device is detected, any communication between the base station and the UEs may be hushed by using the HUSCH algorithm to reduce transmit power. As the conditions at a base station change over time (e.g., hourly, daily, weekly, etc.), the data coverage and/or data transmission can be increased or reduced for the base station.

By way of example, and without limitation, a base station can be configured to utilize the CBRS band to exchange data with one or more UEs in communication with the base station. The base station can monitor the activity in the band and receive interference information from the UEs periodically. As may be understood, a number of incumbent devices within the exclusion zone, or in proximity to UEs in communication with the base station, may vary dynamically over time. In some instances, the rate of data transmission at the base station may be reduced or increased based on an interference level associated with the incumbent devices. Accordingly, the base station can adjust transmit power based on the interference level to optimize wireless communications provided by the base station while avoiding interference with incumbent devices.

In some instances, a base station implementing the techniques discussed herein can use frequency resources in at least one of an LTE Band 71 (e.g., a 600 MHz band), an LTE Band 48 (e.g., 3500 MHz), and the like. In some instances, the frequency resources can include, but are not limited to, LTE Band 1 (e.g., 2100 MHz), LTE Band 2 (1900 MHz), LTE Band 3 (1800 MHz), LTE Band 4 (1700 MHz), LTE Band 5 (850 MHz), LTE Band 7 (2600 MHz), LTE Band 8 (900 MHz), LTE Band 20 (800 MHz GHz), LTE Band 28 (700 MHz), LTE Band 38 (2600 MHz), LTE Band 41 (2500 MHz), LTE Band 50 (1500 MHz), LTE Band 51 (1500 MHz), LTE Band 66 (1700 MHz), LTE Band 70 (2000 MHz), and LTE Band 74 (1500 MHz). In some instances, frequency resources in the range of 600 MHz-6000 MHz can be referred as "low-band" and "mid-band." In some instances, the frequency resources may include "millimeter wave" bands including, but not limited to sub-6 GHz, 26 GHz, 28 GHz, 38 GHz, 39 GHz, 60 GHz, and the like. The techniques discussed herein are applicable to any frequency resources, and are not limited to those expressly recited above.

In some instances, the systems, devices, and techniques described herein can improve a functioning of a network. For example, traditional data handling based on rules to yield to incumbent users is to pause data transmission upon energy detection, wait, rescan, and repeat until the incumbent users leaves the exclusion zone or otherwise stops using the restricted channel. By dynamically reducing the transmit power upon energy detection rather than pausing transmissions, the base station and connected devices can continue transmissions. This allows non-incumbent users to coexist and make optimal use of available data network while still avoiding harmful interference with Incumbent Access users. Moreover, by using an algorithm to dynamically adjust the transmit power, the base stations can optimize the coverage area and data throughput in wireless communications. These and other improvements to the functioning of a computer and network are discussed herein.

The systems, devices, and techniques described herein can be implemented in a number of ways. Example implementations are provided below with reference to the following figures.

FIG. 1 illustrates an example environment 100 including a base station 102 and a plurality of user equipment (UEs) 104(1)-104(N) (individually and/or collectively referred to herein with reference 104), where N is any integer greater than and/or equal to 2, the base station and the UEs 104 including functionality to dynamically determine the amount of data transmission, based on interference information, to coexist and avoid harmful interference with incumbent device(s) 110, in accordance with embodiments of the disclosure.

The base station 102 can be associated with a coverage area 106, initially. In some instances, the coverage areas 106 and the reduced coverage area 114 can correspond to a geographic region where communications are supported by base station 102. In some instances, the base station 102 can be associated with UEs 104. Of course, any number of UEs can be within the coverage area 106 of the base station 102.

Examples of the user equipment (UEs) 104 can include, but are not limited to, smart phones, mobile phones, cell phones, tablet computers, portable computers, laptop computers, personal digital assistants (PDAs), electronic book devices, or any other portable electronic devices that can generate, request, receive, transmit, or exchange voice, video, and/or digital data over a network. Additional examples of the UEs 104 include, but are not limited to, smart devices such as televisions, refrigerators, washing machines, dryers, smart mirrors, coffee machines, lights, lamps, temperature sensors, leak sensors, water sensors, electricity meters, parking sensors, music players, headphones, or any other electronic appliances that can generate, request, receive, transmit, or exchange voice, video, and/or digital data over a network.

In general, the base station 102 can be implemented as a variety of technologies to provide wired and/or wireless access to the network, as discussed herein. In some instances, the base station 102 can include a 3GPP RAN, such a GSM/EDGE RAN (GERAN), a Universal Terrestrial RAN (UTRAN), or an evolved UTRAN (E-UTRAN), an eNodeB, a gNodeB, a 5G New Radio (NR), and the like, or alternatively, a "non-3GPP" RAN, such as a Wi-Fi RAN, or another type of wireless local area network (WLAN) that is based on the IEEE 802.11 standards. Further, the base station 102 can include any number and type of transceivers and/or base stations representing any number and type of macrocells, microcells, picocells, or femtocells, for example, with any type or amount of overlapping coverage or mutually exclusive coverage.

The base station 102 can further include a heterogeneous uplink synchronous channel (HUSCH) component 108. The HUSCH component 108 is discussed in the context of FIG. 1, as well as throughout this disclosure.

By way of example, the HUSCH component 108 can dynamically determine the coverage area for the base station 102. Considering an example where the incumbent device(s) 110 is not present within the coverage area 106, the base station 102 may use the CBRS to communicate with the UEs 104, as discussed herein. At a first time, the UEs 104 are communicating with the base station 102 at a first data throughput. As one or more incumbent device(s) 110 enter the coverage area 106, the UE 104(2) may detect energy 112 from the one or more incumbent device(s) 110 and may provide uplink feedback informing of the interference to the base station 102. In some embodiments, a determination that the interference level is above a threshold may be made at the base station 102 based on information received from the UE 104(2). In response to the interference level being above a threshold, the HUSCH component 108 may determine to reduce the data coverage of the base station 102 from the coverage area 106 to the reduced coverage area 114. Additional information to be received by the base station 102 in determining HUSCH transmission is discussed below in FIG. 2, as well as throughout this disclosure.

In some examples, the base station 102 can provide interference information to the UEs 104, such that when one or more UEs 104 experience interference levels that meets or exceeds an interference threshold from incumbents, the HUSCH component installed at the each UEs 104 may reduce the data throughput of the individual UEs 104. That is, the base station 102 and the connected UEs 104 may each lower their data transmission rate to a rate determined by the HUSCH algorithm to not cause harmful interference to the incumbents. In various examples, the HUSCH algorithm may determine a baseline data transmission rate based on historical data, and the lower transmission rate may be percentage reduction of the baseline data transmission rate. The historical data may be determined for individual base stations and/or as aggregated historical data for based stations within a geographical area.

In some instances, the environment 100 can further include one or more communication servers to facilitate communications by and between the various devices in the environment 100. That is, environment 100 can include any computing devices implementing various aspects of one or more of second, third, fourth generation, and fifth generation (2G, 3G, 4G, and 5G) cellular-wireless access technologies, which may be cross-compatible and may operate collectively to provide data communication services. Global Systems for Mobile (GSM) is an example of 2G telecommunications technologies; Universal Mobile Telecommunications System (UMTS) is an example of 3G telecommunications technologies; and Long Term Evolution (LTE), including LTE Advanced, and Evolved High-Speed Packet Access (HSPA+) are examples of 4G telecommunications technologies. Thus, the environment 100 may implement GSM, UMTS, and/or LTE/LTE Advanced telecommunications technologies. The environment 100 may include, but is not limited to, a combination of: base transceiver stations BTSs (e.g., NodeBs, Enhanced-NodeBs), Radio Network Controllers (RNCs), serving GPRS support nodes (SGSNs), gateway GPRS support nodes (GGSNs), proxies, a mobile switching center (MSC), a mobility management entity (MME), a serving gateway (SGW), a packet data network (PDN) gateway (PGW), an evolved packet data gateway (e-PDG), an Internet Protocol (IP) Multimedia Subsystem (IMS), or any other data traffic control entity configured to communicate and/or route data packets between the UEs 104, the base station 102, and one or more endpoints of the network (e.g., servers, websites, etc.). While FIG. 1 illustrates the example environment 100, it is understood in the context of this document, that the techniques discussed herein may also be implemented in other networking technologies, such as nodes that are part of a wide area network (WAN), metropolitan area network (MAN), local area network (LAN), neighborhood area network (NAN), personal area network (PAN), or the like.

In some instances, the UEs 104 can communicate with any number of user equipment, servers, network devices, computing devices, and the like.

Figure 2:
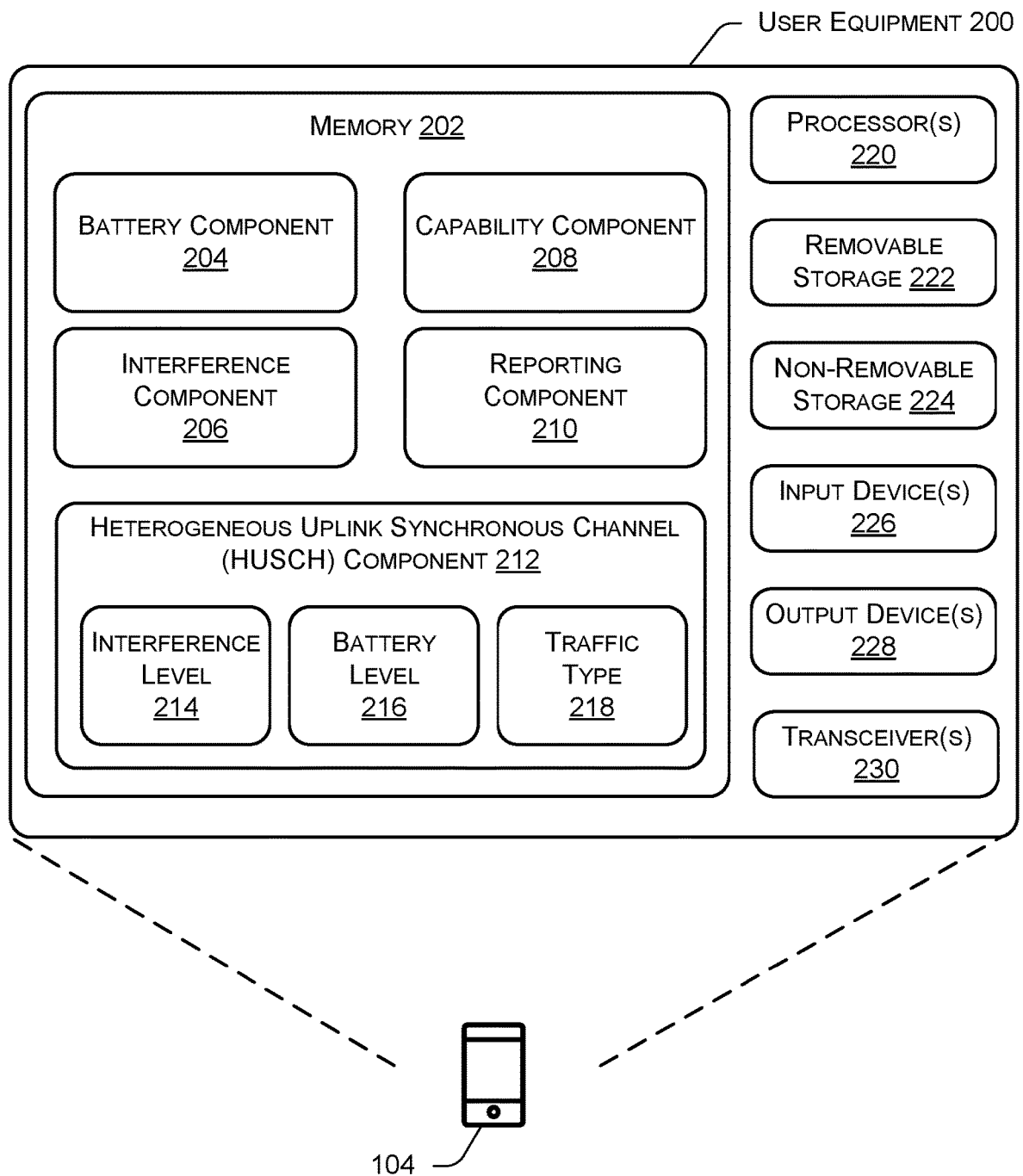
FIG. 2 illustrates an example user equipment configured to dynamically determine data throughput for communications with a base station, in accordance with embodiments of the disclosure.

FIG. 2 illustrates an example user equipment (UE) 200 configured to dynamically determine data throughput for communications with a base station, in accordance with embodiments of the disclosure. In some embodiments, the UE 200 can correspond to the UEs 104 of FIG. 1. It is to be understood in the context of this disclosure that the UE 200 can be implemented as a single device or as a plurality of devices with components and data distributed among them.

As illustrated, the UE 200 comprises a memory 202 storing the battery component 204, an interference component 206, a capability component 208, a reporting component 210, and a heterogeneous uplink synchronous channel (HUSCH) component 212. The heterogeneous uplink synchronous channel (HUSCH) component 212 further includes the interference level 214, the battery level 216, and the traffic type 218. Also, the UE 200 includes processor(s) 220, a removable storage 222 and non-removable storage 224, input device(s) 226, output device(s) 228, and transceiver(s) 230.

In various embodiments, the memory 202 is volatile (such as RAM), non-volatile (such as ROM, flash memory, etc.) or some combination of the two. The battery component 204, the interference component 206, the capability component 208, the reporting component 210, and the heterogeneous uplink synchronous channel (HUSCH) component 212 stored in the memory 202 can comprise methods, threads, processes, applications or any other sort of executable instructions. The battery component 204, the interference component 206, the capability component 208, the reporting component 210, and the heterogeneous uplink synchronous channel (HUSCH) component 212 can also include files and databases.

The battery component 204 can include functionality to receive battery information and determine battery level of the UE. In some examples, the battery information can include but is not limited to: a capacity of the battery; the percentage of charge remaining; and an approximate run-time remaining for the UE. In some instances, the battery component 204 can interact with the interference component 206 to determine a predetermined time lapse between scanning the channel for interference, the battery information including charge remaining information may be used for determining the frequency of scans. For example, if the battery level of the UE is above threshold level, the UE may scan the channels at a threshold predetermined time, however, when the battery level is below the threshold level, the UE may scan infrequently or not at all. In some instances, the battery component 204 can set the predetermined time lapse between scans to a default time, and when the battery level falls below a certain threshold level (e.g., below 50%, 30%, 25%, etc.) the predetermined time lapse may increase inversely in proportion to the battery level. In some instances, the battery component 204 can include a threshold low battery level (e.g., below 20%) which can be used to determine to stop scanning for interference but instead rely on the base station to inform the UE of interference.

The interference component 206 can include functionality to trigger scans with the UE hardware and receive interference information. In various examples, the interference component 206 may interact with the battery component 204 to wait for a predetermined time before repeating scans. In some instances, the interference component 206 can detect energy on the channel. In some instances, the interference component 206 can determine if the energy is originating from an incumbent device. The energy detection is technology agnostic. That is, the energy detection is not limited to any one particular incumbent device type or technology, but rather energy detection applies to all current and future incumbents.

In additional examples, the interference component 206 can include functionality to receive interference information from a base station. In some instances, the received interference information can be based at least in part on interference information captured by other individual UEs when the UEs are connected to a base station. In some instances, the received interference information can include information about base stations that are adjacent to a particular base station. In some instances, the interference information can correspond to a signal-to-noise ratio (SNR) and/or a signal-to-interference-plus-noise ratio (SINR) associated with one or more channels with the frequency resources allocated to a base station. In some instances, the interference information can include individual interference information associated with one or more UEs in communication with a base station, and in some instances, the interference information can represent aggregate interference levels at a base station. In some instances, the interference information can include, but is not limited to: a received signal strength indication (RSSI); reference signal received power (RSRP); reference signal received quality (RSRQ); and the like.

The capability component 208 can include functionality to inform the base station of capability information associated with one or more UEs in communication with a base station. For example, as the UE initiates communication with a base station, the UE can provide an indication to the base station regarding which frequency resources are supported by the UE.

The reporting component 210 can include functionality to communicate with the base station 102 regarding the interference status based on energy detected in the CBRS band. For example, the reporting component 210 can receive interference information from interference component 206 and capability information from capability component 208. The reporting component 210 may receive data from the HUSCH component 212 including the interference level 214, the battery level 216, and the traffic type 218, and may provide the data to the base station.

In general, the heterogeneous uplink synchronous channel (HUSCH) component 212 can include functionality to dynamically determine the data transmission for the base station and UEs. As discussed above, the HUSCH component 212 includes data associated with the interference level 214, the battery level 216, and the traffic type 218. In some instances, the HUSCH component 212 may generate a HUSCH algorithm using the data associated with the interference level 214, the battery level 216, and the traffic type 218 (e.g., real time, streaming, passive, etc.). The HUSCH algorithm may be used by the UE and base station to determine a data transmission rate or data throughput to allow the UE and the base station to maintain communication without interfering with incumbent devices. In some instances, the HUSCH algorithm may use one or more machine learning models to optimize the data transmission rate or data throughput for the UE.

In some embodiments, the processor(s) 220 is a central processing unit (CPU), a graphics processing unit (GPU), or both CPU and GPU, or other processing unit or component known in the art.

The UE 200 also includes additional data storage devices (removable and/or non-removable) such as, for example, magnetic disks, optical disks, or tape. Such additional storage is illustrated in FIG. 2 by removable storage 222 and non-removable storage 224. Tangible computer-readable media can include volatile and nonvolatile, removable and non-removable media implemented in any method or technology for storage of information, such as computer readable instructions, data structures, program modules, or other data. The memory 202, the removable storage 222 and the non-removable storage 224 are all examples of computer-readable storage media. Computer-readable storage media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information and which can be accessed by the UE 200. Any such tangible computer-readable media can be part of the UE 200.

The UE 200 can include input device(s) 226, such as a keypad, a cursor control, a touch-sensitive display, etc. Also, the UE 200 can include output device(s) 228, such as a display, speakers, etc. These devices are well known in the art and need not be discussed at length here.

As illustrated in FIG. 2, the UE 200 can include one or more wired or wireless transceiver(s) 230. For example, the transceiver(s) 230 can include a network interface card (NIC), a network adapter, a LAN adapter, or a physical, virtual, or logical address to connect to various network or the base station 102 illustrated in the environment 100, for example. In some wireless embodiments, to increase throughput, the transceiver(s) 230 can utilize multiple-input/multiple-output (MIMO) technology. The transceiver(s) 230 can be any sort of wireless transceivers capable of engaging in wireless, radio frequency (RF) communication, as discussed herein. The transceiver(s) 230 can also include other wireless modems, such as a modem for engaging in Wi-Fi, WiMAX, Bluetooth, infrared communication, or the like.

Figure 3:
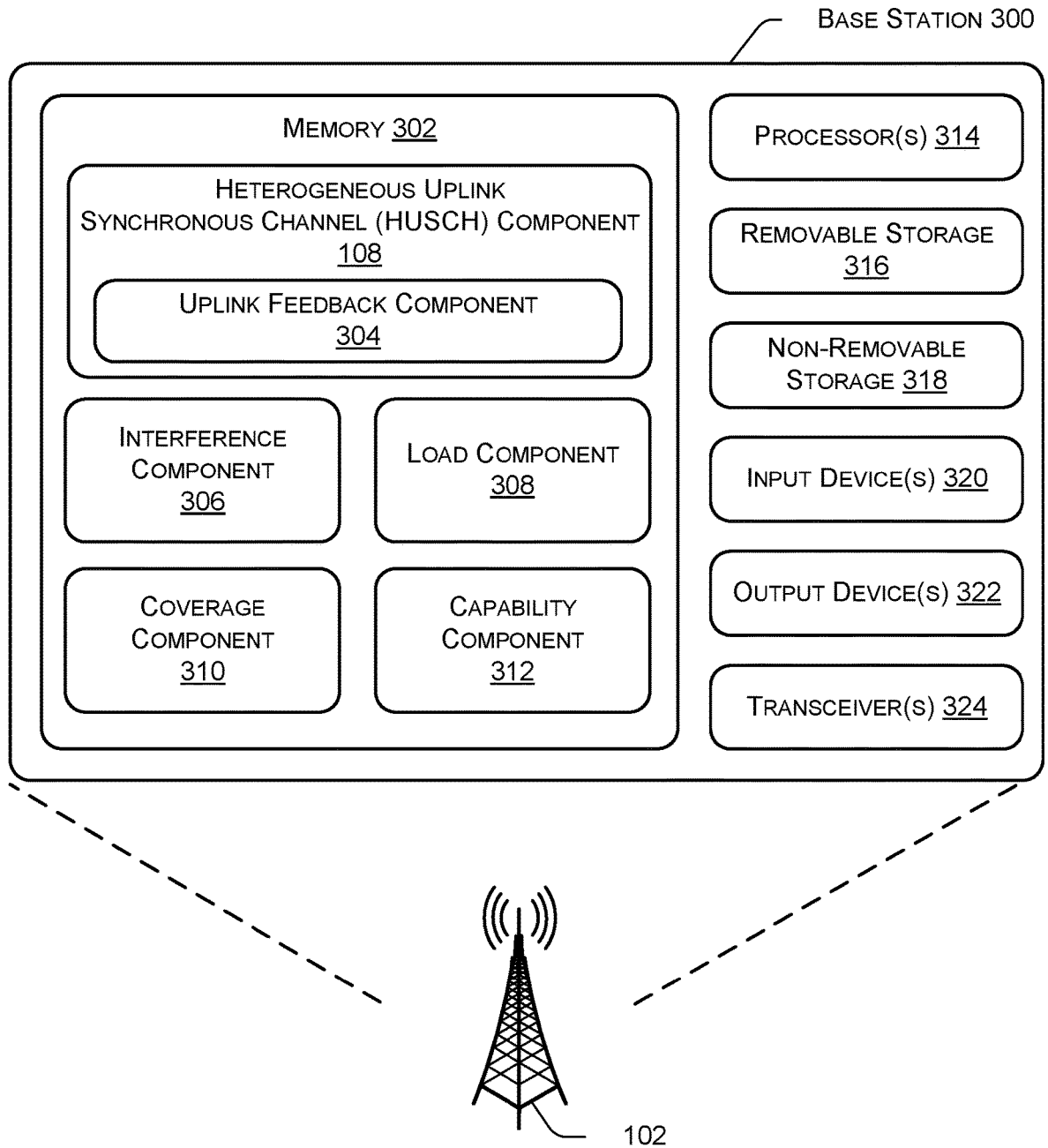
FIG. 3 illustrates an example base station configured to monitor interference level(s) in the spectrum and to dynamically determine data coverage and data throughput for wireless communications with one or more UEs, in accordance with embodiments of the disclosure.

FIG. 3 illustrates an example base station 300 configured to receive frequency resources allocated to the base station by a network device, and to facilitate one or more communications using carrier aggregation, in accordance with embodiments of the disclosure. In some embodiments, the base station 300 can correspond to base station 102 of FIG. 1. It is to be understood in the context of this disclosure that the base station 300 can be implemented as a single device or as a plurality of devices with components and data distributed among them.

As illustrated, the base station 300 comprises a memory 302 storing a heterogeneous uplink synchronous channel (HUSCH) component 108, an interference component 306, a load component 308, a coverage component 310, and a capability component 312. The HUSCH component 108 includes an uplink feedback component 304. Also, the base station 300 includes processor(s) 314, a removable storage 316 and non-removable storage 318, input device(s) 320, output device(s) 322, and transceiver(s) 324.

In various embodiments, the memory 302 is volatile (such as RAM), non-volatile (such as ROM, flash memory, etc.) or some combination of the two. The HUSCH component 108, the interference component 306, the load component 308, the coverage component 310, and the capability component 312 stored in the memory 302 can comprise methods, threads, processes, applications or any other sort of executable instructions. The HUSCH component 108, the interference component 306, the load component 308, the coverage component 310, and the capability component 312 can also include files and databases.

The HUSCH component 108 can include the uplink feedback component 304 with functionality to receive uplink feedback from the UEs connected to the base station 300. The uplink feedback from the individual UEs may include data associated with the particular UE including the interference level, the battery level, and the traffic type. In some instances, the HUSCH component 108 can configure the base station 300 to operate using a lower transmit power with one or more UEs using reduced data throughput. In some instances, the HUSCH component 108 can update the coverage area of the base station 300 as incumbent devices move in and out of exclusion zone.

The HUSCH component 108 can include functionality to dynamically determine the data coverage and the data transmission for the base station. In some instances, the HUSCH component 108 can dynamically adjust the transmit power and the bit error rate (BER) for the base station. For example, to maintain communication on the CBRS band, the transmit power and BER may be reduced for the base station for certain traffic type (e.g., non-streaming data). As discussed above with respect to the HUSCH component 212, the HUSCH component 108 may receive data associated with the interference level 214, the battery level 216, and the traffic type 218 from UEs. In some instances, the HUSCH component 108 may determine the HUSCH algorithm using the data associated with one or more of the interference level 214, the battery level 216, and the traffic type 218. The HUSCH algorithm may be used by the UE and base station to determine a data transmission rate or data throughput to allow the UE and the base station to maintain communication without interfering with incumbent devices. In some instances, the HUSCH algorithm may use one or more machine learning models to optimize data transmission for the base station.

The machine learning models can include functionality to determine data coverage and transmission for a base station based at least in part on some or all of the information received from the particular base station, as discussed herein. For example, the machine learning models can include one or more models that receive as inputs the interference level at a base station and provide as an output one or more adjustment to data coverage and/or transmission rate for the base station. In some instances, the machine learning models can be based at least in part on historical data of base station operating conditions. In some instances, various machine learned models can be used. For instance, supervised machine learning algorithms, unsupervised machine learning algorithms, deep learning algorithms, etc. can be used for generating (e.g., training) the machine learned models. Examples of machine learning algorithms include, but are not limited to: decision trees; k-means clustering; principal component analysis; neural networks; convolutional neural networks; deep neural networks; recurrent neural networks; and the like.

The interference component 306 can include functionality to receive interference information from the base station scanning the channels. In some instances, the interference component 306 can detect energy on the channel. The energy detection is technology agnostic. That is, energy detection is for any existing and future incumbent devices and technology.

The interference component 306 can include functionality to determine interference information associated with communications by and between one or more UEs and the base station 300. In some instances, the interference information can correspond to a signal-to-noise ratio (SNR) and/or a signal-to-interference-plus-noise ratio (SINR) associated with one or more channels with the frequency resources allocated to the base station 300. In some instances, the interference information can include individual interference information associated with one or more UEs in communication with the base station 300, and in some instances, the interference information can represent aggregate interference levels at the base station 300. In some instances, the interference information can include, but is not limited to: a received signal strength indication (RSSI); reference signal received power (RSRP); reference signal received quality (RSRQ); and the like.

The load component 308 can include functionality to determine a load at the base station 300. In some examples, the load component 308 can determine one or more of: a number of UEs connected to the base station 300; an amount of bandwidth of traffic handled by the base station 300 (e.g., relative to a total amount of bandwidth); a size of packet queues associated with the base station 300; a number of dropped packets of the base station 300; a delay associated with one or more communication of the base station 300; a number of channels used by one or more UEs; a packet jitter associated with the base station 300; and the like. In some instances, the load component 308 can determine a load associated with each frequency resource. In some instances, the load component 308 can include one or more threshold values that indicate, when a respective measured condition meets or exceeds those one or more threshold values, whether the base station is experiencing a congestion condition.

The coverage component 310 can include functionality to determine coverage information associated with the base station 300. In some instances, the coverage information can be associated with a geographic region of the base station signals, which may vary by frequency resources. For example, a coverage area of the base station 300 using gigahertz waves may be smaller than a coverage area of the base station 300 using megahertz waves. In some instances, the coverage component 310 can include location information associated with individual UEs in communication with the base station 300. For example, individual UEs can send location information (e.g., determined via GPS) to the base station 300, and in some instances, a location of a UE can be triangulated by capturing signals associated with a UE at various base stations. In some instances, the coverage component 310 can provide coverage information to the UE 200.

The capability component 312 can include functionality to receive capability information from one or more UEs in communication with the base station 300. For example, the capability information can include, but is not limited to: indications from one or more UEs that the UE can utilize a particular frequency resource; indications that a UE can support carrier aggregation; that a UE can support real time text (RTT), voice, video, data, etc.; and the like.

In some embodiments, the processor(s) 314 is a central processing unit (CPU), a graphics processing unit (GPU), or both CPU and GPU, or other processing unit or component known in the art.

The base station 300 also includes additional data storage devices (removable and/or non-removable) such as, for example, magnetic disks, optical disks, or tape. Such additional storage is illustrated in FIG. 3 by removable storage 316 and non-removable storage 318. Tangible computer-readable media can include volatile and non-volatile, removable and non-removable media implemented in any method or technology for storage of information, such as computer readable instructions, data structures, program modules, or other data. The memory 302, the removable storage 316 and the non-removable storage 318 are all examples of computer-readable storage media. Computer-readable storage media include, but are not limited to, RAM, ROM, EEPROM, flash memory or other memory technology, CD-ROM, digital versatile discs (DVD), content-addressable memory (CAM), or other optical storage, magnetic cassettes, magnetic tape, magnetic disk storage or other magnetic storage devices, or any other medium which can be used to store the desired information and which can be accessed by the base station 300. Any such tangible computer-readable media can be part of the base station 300.

The base station 300 may be configured to communicate over a telecommunications network using any common wireless and/or wired network access technology. Moreover, the base station 300 may be configured to run any compatible device operating system (OS), including but not limited to, Microsoft Windows Mobile, Google Android, Apple iOS, Linux Mobile, as well as any other common mobile device OS.

The base station 300 also can include input device(s) 320, such as a keypad, a cursor control, a touch-sensitive display, voice input device, etc., and output device(s) 322 such as a display, speakers, printers, etc.

As illustrated in FIG. 3, the base station 300 also includes one or more wired or wireless transceiver(s) 324. For example, the transceiver(s) 324 can include a network interface card (NIC), a network adapter, a LAN adapter, or a physical, virtual, or logical address to connect to various network or the user equipment (UEs) 104 illustrated in the environment 100, for example. To increase throughput when exchanging wireless data, the transceiver(s) 324 can utilize multiple-input/multiple-output (MIMO) technology. The transceiver(s) 324 can comprise any sort of wireless transceivers capable of engaging in wireless, radio frequency (RF) communication. The transceiver(s) 324 can also include other wireless modems, such as a modem for engaging in Wi-Fi, WiMAX, Bluetooth, infrared communication, and the like.

Figure 4:
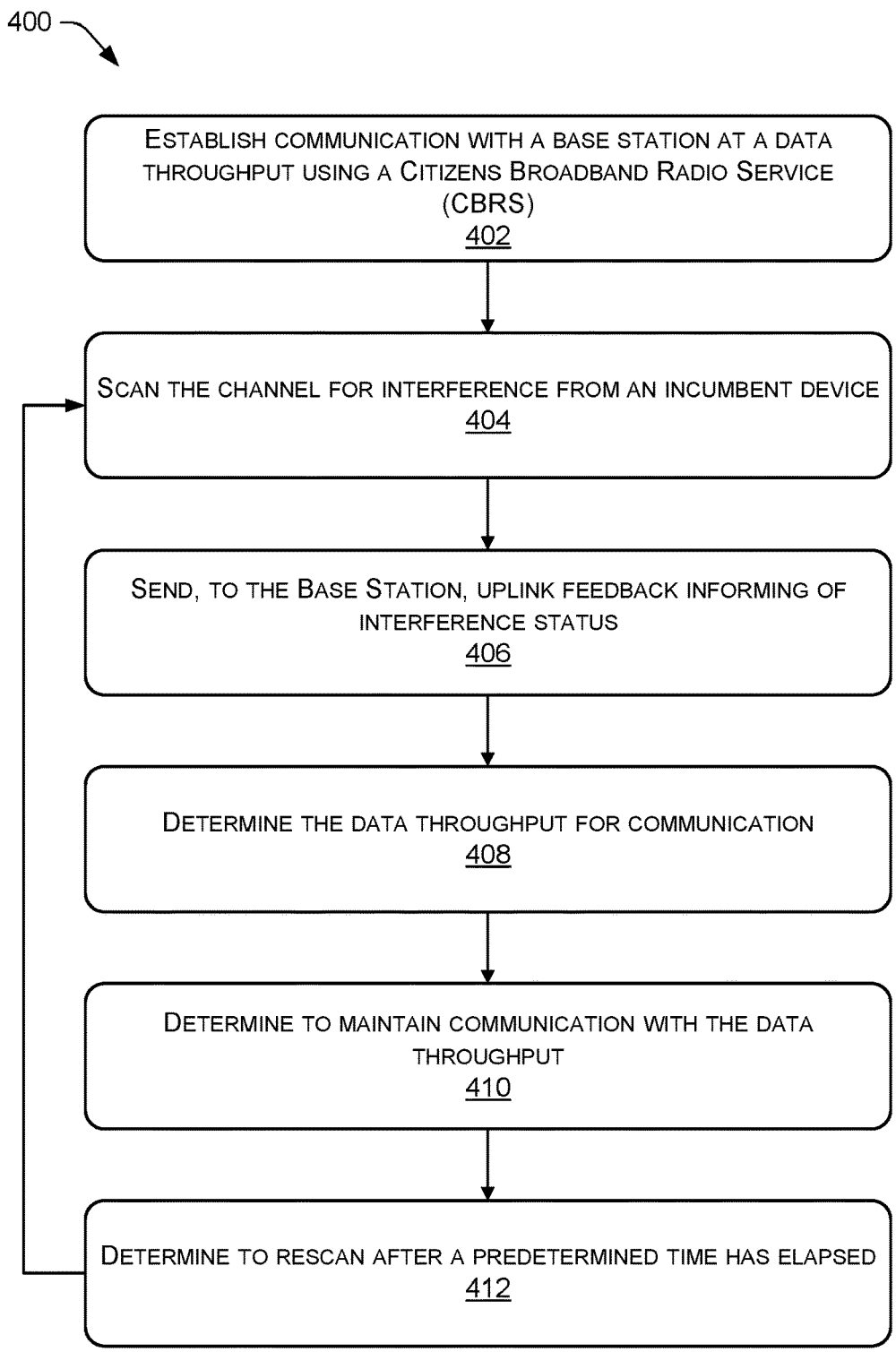
FIG. 4 illustrates an example process for monitoring energy in a spectrum, providing uplink feedback including interference information to a base station, and using the interference information to dynamically determine data throughput, in accordance with embodiments of the disclosure.
Figure 5:
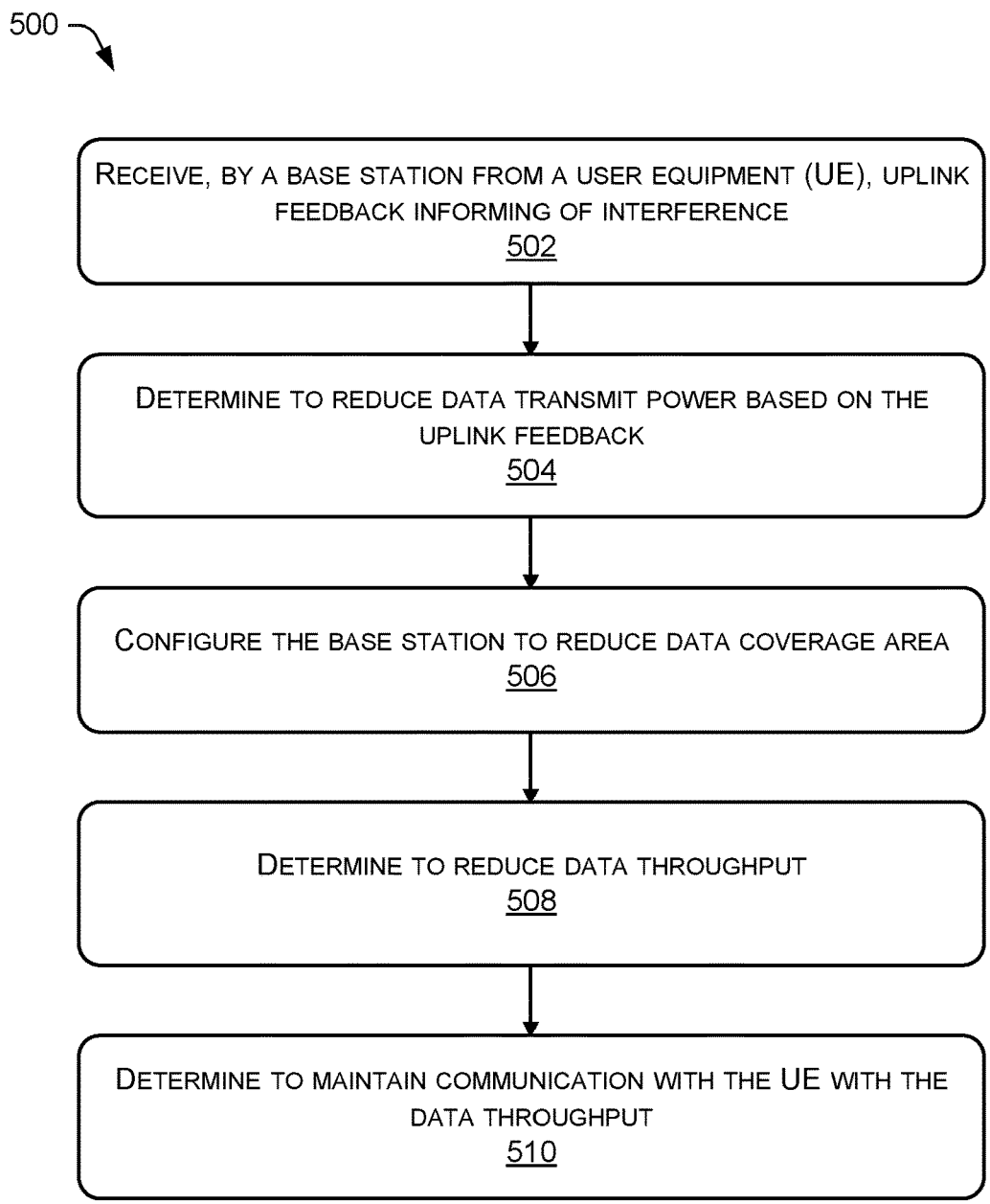
FIG. 5 illustrates an example process for receiving uplink feedback including interference information at a base station and using the interference information to dynamically determine data coverage and data throughput, in accordance with embodiments of the disclosure.

FIGS. 4 and 5 illustrate example processes in accordance with embodiments of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

FIG. 4 illustrates an example process 400 for monitoring energy in spectrum, providing uplink feedback informing of interference to a base station, and using the interference information to dynamically determine data throughput, in accordance with embodiments of the disclosure. The example process 400 can be performed by the user equipment (UEs) 104 (or another component), in connection with other components discussed herein. Some or all of the process 400 can be performed by one or more devices, equipment, or components illustrated in FIGS. 1-3, for example.

At operation 402, the process can include establishing communication with a base station at a data throughput using a Citizens Broadband Radio Service (CBRS). As discussed herein, the user equipment (UE) can connect to a base station, at an initial data throughput. In some instances, the base station may use the CBRS as long as it does not cause harmful interference for the incumbent users and associated devices.

At operation 404, the process can include scanning the channel for interference from an incumbent device. For example, the UE can scan the channel for interference from an incumbent device and receive interference information. In various examples, the UE may wait for a predetermined time before repeating scans. In some instances, the UE can detect energy on the channel and determine if the energy is originating from an incumbent device.

At operation 406, the process can include sending, to the base station, uplink feedback informing of interference status. In some instances, the UE can communicate with the base station regarding the interference status based on energy detected in the CBRS band. For example, the UE can receive interference information from scanning. The UE may provide uplink feedback and data including the interference level, the battery level, and the traffic type to the base station. In some instances, there may not be any incumbent devices within the exclusion zone and the UE can communicate with the base station regarding the free from interference status.

At operation 408, the process can include determining the data throughput rate for communication (e.g., megabits per second, or the like). For example, if the scan from the operation 404 detects energy from an incumbent device, the HUSCH algorithm may dynamically determine to reduce the data throughput based on interference level and traffic type to avoid harmful interference with incumbent device(s). In some instances, if the scan from the operation 404 fails to detect presence of any incumbent device(s), the HUSCH algorithm may determine to maximize the data throughput as allowed.

At operation 410, the process can include determining to maintain communication with the data throughput. In some instances, as described above, the data throughput may be dynamically determined based on the interference level and traffic type. Instead of pausing transmission, the UE can continue communication with the base station with the data throughput.

At operation 412, the process can include determining to rescan the channel after a predetermined time has elapsed. For example, conditions at the UE may change based on time. In some instances, an incumbent device may move into the exclusion zone in that time thus to monitor the channel, the UE may perform periodic scan. In some instances, the predetermined time may be based on the battery level of the UE, such that a fully charged UE may rescan a default time, while less than half charged UE may rescan at a longer time interval to avoid draining further draining the battery. After the predetermined time has elapsed, the operation 412 may return to the operation 404 to perform the scan.

FIG. 5 illustrates an example process 500 for receiving uplink feedback informing of interference at a base station and using the uplink feedback to dynamically determine data coverage and data throughput, in accordance with embodiments of the disclosure. The example process 500 can be performed by the base stations 102 (or another component), in connection with other components discussed herein. Some or all of the process 500 can be performed by one or more devices, equipment, or components illustrated in FIGS. 1-3, for example.

At operation 502, the process can include receiving, by a base station from a user equipment (UE), uplink feedback informing of interference. As discussed herein, in some instances, uplink feedback can include, but is not limited to, one or more of: interference information; capability information; and data from the UE including the interference level, battery level, and traffic type. In some instances, the interference information may indicate an absence of incumbent devices detected.

At operation 504, the process can include determining to reduce data transmit power based on the uplink feedback. For example, the uplink feedback can indicate energy detected from an incumbent device. As discussed herein, the reduction to data transmit power can be determined by the HUSCH algorithm and/or one or more machine learning algorithms. The algorithm may determine to reduce at least one of a data footprint by decreasing the coverage area or the data throughput.

At operation 506, the process can include configuring the base station to reduce data coverage area. In some instances, the operation 504 may dynamically determine to reduce the coverage area of the base station. In some instances, the operation 506 can configure the base station to reduce data coverage area.

At operation 508, the process can include determining to reduce data throughput. As discussed herein, the operation 504 may dynamically determine to reduce the data throughput. The reduced data throughput may prevent the base station and UE from interference with the incumbent devices.

At operation 510, the process can include determining to maintain communication with the UE at the data throughput. As discussed herein, the HUSCH algorithm may reduce the data throughput to allow the base station to maintain communication with the UE instead of pausing transmission.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A system for dynamically adjusting transmit power to maintain transmission in a heterogeneous network, the system comprising:
one or more processors;
a memory; and
one or more components stored in the memory and executable by the one or more processors to perform operations comprising:
  establishing wireless communication, by a user equipment, with a base station at a first data transmission rate using frequency resources associated with a Citizens Broadband Radio Service (CBRS);
  scanning a channel within the frequency resources for energy from an incumbent device;
  sending, to the base station, uplink feedback including interference information;
  determining a second data transmission rate based at least on the interference information, the second data transmission rate set low enough to avoid harmful interference with the incumbent device;
  determining to maintain the wireless communication at the second data transmission rate;
  determining to rescan the channel after a predetermined time has elapsed;
  determining, based on the rescan, that the energy from the incumbent device is absent from the channel;
  sending, to the base station, second uplink feedback including second interference information; and
  performing one of:
    (1) (i) determining a third data transmission rate based at least on the second interference information, the third data transmission rate set higher than the second data transmission rate based at least in part on the energy being absent, and
    (ii) determining to maintain the wireless communication at the third data transmission rate; or
    (2) returning to the first data transmission rate for the wireless communication.

2. The system of claim 1, wherein the operations further comprise:
receiving, from the base station, additional interference information indicating that at least one user equipment in communication with the base station has detected energy from an additional incumbent device; and
determining a fourth data transmission rate that is lower than the second data transmission rate based at least on the additional interference information.

3. The system of claim 1, wherein the operations further comprise:
receiving, from the base station, coverage information indicating a geographic region associated with the base station.

4. The system of claim 1, wherein the predetermined time is based at least in part on a battery level of the user equipment.

5. A device comprising:
one or more processors;
a memory; and
one or more components stored in the memory and executable by the one or more processors to perform operations comprising:
  establishing wireless communication, from a base station to a user equipment, at a first data transmission rate using frequency resources associated with a Citizens Broadband Radio Service (CBRS);
  receiving, at the base station from the user equipment, uplink feedback including interference information;
  determining to reduce data transmit power based at least in part on the uplink feedback;
  determining to reduce the first data transmission rate to a second data transmission rate;
  determining to maintain wireless communications, from the base station, using the frequency resources associated with the CBRS at the second data transmission rate;
  establishing wireless communication by the base station with a second user equipment;
  sending, to the second user equipment, the interference information;
  receiving, at the base station from the second user equipment, second uplink feedback including second interference information; and
  sending, to the user equipment, the second interference information.

6. The device of claim 5, wherein determining to reduce the data transmit power is based at least in part on energy detection from an incumbent device.

7. The device of claim 5, wherein the uplink feedback further includes traffic type associated with the user equipment.

8. The device of claim 5, wherein the operations further comprise:
configuring the base station to reduce data coverage area.

9. The device of claim 8, wherein the operations further comprise:
dynamically updating the data coverage area for the base station over time.

10. The device of claim 5, wherein the operations further comprise:
receiving, at the base station from the user equipment, third uplink feedback including third interference information;
wherein sending the second interference information comprises sending, the second interference information when the second interference information indicates a higher level of interference than detected with respect to the third interference information.

11. The device of claim 10, wherein the operations further comprise:
scanning, by the base station, a spectrum for second interference information; and
sending, to the user equipment and the second user equipment, the second interference information, the second interference information indicating a higher level of interference than previously detected.

12. The device of claim 5, wherein the determining to reduce data transmit power further comprise using at least one algorithm to determine a maximum allowable transmit power based at least in part on the interference information.

13. A method implemented by one or more processors, the method comprising:
    establishing wireless communication, by a user equipment, with a base station at a first data transmission rate using a frequency resource associated with a restricted band, the restricted band including priority access to incumbent devices;
    receiving, from the base station, interference information associated with energy detected from an incumbent device;
    determining a second data transmission rate based at least in part on the interference information, the second data transmission rate being lower than the first data transmission rate;
    determining to maintain the wireless communication using the frequency resource at the second data transmission rate;
    scanning the channel after the predetermined time has elapsed; and
    determining to pause or delay rescanning the channel based at least in part on the battery level falling below a low threshold level.

14. The method of claim 13, wherein the second data transmission rate is further based at least in part on a data traffic type for the wireless communication.

15. The method of claim 13, wherein the method further comprises:
    receiving, from the base station, second interference information associated with energy detection from a second incumbent device; and
    determining a third data transmission rate based at least in part on the second interference information.

16. The method of claim 13, wherein the method further comprises:
    scanning a channel for energy from one or more incumbent devices; and
    sending, to the base station, uplink feedback based at least in part on the energy from the one or more incumbent devices.

17. The method of claim 13, wherein the method further comprises:
    scanning a channel for energy from one or more incumbent devices; and
    determining a predetermined time to rescan the channel based at least in part on the battery level associated with the user equipment.

* * * * *